US008417801B2

(12) United States Patent
Dalal et al.

(10) Patent No.: US 8,417,801 B2
(45) Date of Patent: *Apr. 9, 2013

(54) MANAGING REMOTE COMPUTER TRAINING LABS

(75) Inventors: Sanjay Dalal, Fremont, CA (US);
Chun-Kwok Lee, San Jose, CA (US);
Edward Wong, Fremont, CA (US);
Zheng Yuan, San Jose, CA (US);
Srinath Anantharaman, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/292,583

(22) Filed: Nov. 9, 2011

(65) Prior Publication Data

US 2012/0059915 A1 Mar. 8, 2012

Related U.S. Application Data

(63) Continuation of application No. 10/913,813, filed on Aug. 6, 2004, now Pat. No. 8,078,676.

(51) Int. Cl.
*G06F 15/177* (2006.01)
*G06F 15/16* (2006.01)
*G06F 15/173* (2006.01)

(52) U.S. Cl.
USPC ........................................................ 709/220

(58) Field of Classification Search .......... 709/200–204, 709/223
See application file for complete search history.

(56) References Cited

U.S. PATENT DOCUMENTS

| 5,176,520 | A | 1/1993 | Hamilton |
| 5,974,446 | A | 10/1999 | Sonnenreich et al. |
| 6,223,212 | B1 | 4/2001 | Batty et al. |
| 6,288,753 | B1 | 9/2001 | DeNicola et al. |
| 6,343,313 | B1 | 1/2002 | Salesky et al. |
| 6,356,943 | B2 | 3/2002 | Murray et al. |
| 6,363,352 | B1 | 3/2002 | Dailey et al. |
| 6,371,765 | B1 | 4/2002 | Wall et al. |
| 6,760,748 | B1* | 7/2004 | Hakim .......................... 709/204 |
| 6,915,336 | B1 | 7/2005 | Hankejh et al. |
| 6,988,138 | B1 | 1/2006 | Alcorn et al. |
| 7,016,949 | B1* | 3/2006 | Tagawa ......................... 709/223 |
| 7,130,888 | B1 | 10/2006 | Hickman et al. |
| 7,467,187 | B2 | 12/2008 | Hesselink et al. |
| 2002/0072048 | A1 | 6/2002 | Slattery et al. |
| 2003/0041109 | A1 | 2/2003 | Meloni et al. |
| 2003/0041121 | A1 | 2/2003 | Levine |
| 2004/0121299 | A1* | 6/2004 | Rougeau et al. .............. 434/365 |

* cited by examiner

*Primary Examiner* — Minh-Chau Nguyen

(57) ABSTRACT

An educational and training system allows organization and management of computers and course material used in teaching and administering classes of computer based information. Remote users access computers in laboratories or virtual classrooms as if they were actually using the computers within the laboratory or classroom. The system also allows management and tracking of the remote users and of other various course details.

19 Claims, 18 Drawing Sheets

| Hands-on Lab | | | | |
|---|---|---|---|---|
| Lab Name | Description | Total Computers | Computers in Session | Lab Schedule |
| Design room | This room is used for the training about Photoshop, CorelDraw, Illustrator etc. | 30 | 10 | View Schedule |
| OA training room | This room is used for the training about Office2000, Email, Workflow | 15 | 3 | View Schedule |
| Hardware training room | No related description. | 15 | 0 | View Schedule |
| WebEx training | This room is used for the training about WebEx Meeting Center, WebEx Training Center | 25 | 22 | View Schedule |

Copyright © 2002 WebEx Communications, Inc.
Privacy | Terms of Service

FIG. 6

Hands-on Lab: Design Room

This room is used for the training about Photoshop, CorelDraw, Illustrator etc.

6 total, 1 in session, 1 offline

| Computer | Status | Shared Applications | Action |
|---|---|---|---|
| ☐ Computer01 | Available | Photoshop, Illustrator | Connect |
| ☐ Computer02 | Available | Photoshop, Illustrator | Connect |
| ☐ Computer03 | Available | Photoshop, Illustrator | Connect |
| ☐ Computer04 | In Session | Photoshop, Illustrator | Disconnect |
| ☐ Computer05 | Offline | Photoshop, Illustrator | |
| ☐ Computer06 | Available | Photoshop, Illustrator | Connect |

[Remove] [Move To...] [Set Up Computer] [Go Back]

Copyright © 2002 WebEx Communications, Inc.
Privacy | Terms of Service

FIG. 7

Computers Unavailable

There are not enough computers from lab PC to fllfill your reservation request of 25 computers from 10:30 am to 12:30 pm for one or more days of your training you want to schedule.

View Lab Schedule...

You can either reschedule the training session to avoid the following schedule conflicts, decrease the number of computers you reserve, or negotiate with the hosts of the training sessions that have conflict with your schedule.

| Conflicting Schedule | | |
|---|---|---|
| Date | Conflict with Session | Computers Still Available |
| Wednesday, February 6, 2002 | ■ Introduction to Excel hosted by Mary Xie from 10:30 am - 11:30 am | 19 |
| | ■ Photoshop 101 hosted by Jimmy from 10:00 am - 12:30 pm | |
| | ■ Computer Applications hosted by Alfred from 9:45 am - 10:45 am | |
| Monday, February 11, 2002 | ■ Photoshop 101 hosted by Jimmy from 10:00 am - 12:30 pm | 0 |
| | ■ Unlisted session | |
| | ■ Photoshop 101 hosted by Jimmy from 10:00 pm - 12:30 am | |

Close

FIG. 9

Session Scheduled
Thank you. You have successfully scheduled your session.

To start your session
Shortly before your session's starting time, click the Start Now link for your session on the My Webex page.

1. Go to My Webex.
2. Click the Start Now link next to your session.

Session Information
Topic: zxasdfas
Host: Simon Lee
Date: Monday, April 29, 2002
Time: 2:45 am GMT -07:00, Pacific Daylight Time (San Jose)
Location: https://us5.webex.com/livetraining

Hands-on Lab
You have successfully reserved 25 computers from lab PC from 12:15 pm to 2:30 pm, Pacific ST on the following dates:

Saturday, April 27, 2002
Monday, April 29, 2002
Saturday, May 4, 2002
Monday, May 11, 2002

To start using hands-on lab during the training session, select Start Hands-on Lab from the Lab menu.

[OK] [Edit]

Copyright © 2002 WebEx Communications, Inc.
Privacy | Terms of Service

FIG. 16

MANAGING REMOTE COMPUTER TRAINING LABS

This application is a continuation application of U.S. patent application Ser. No. 10/913,813, filed on Aug. 6, 2004, the entirety of which is incorporated herein by reference.

TECHNICAL FIELD

The present invention relates to permitting training of multiple users at remote sites using geographically remote computer equipment and, more particularly, to a system and method for managing remote computer training labs.

BACKGROUND

In an academic or training environment, teaching and learning may include lecture and practice components. Generally, lecture includes one-to-many teaching where an instructor presents information to a group of co-located students in a classroom or other facility. Often, the lecture component involves a presentation of information or a demonstration with limited interaction or active participation by a significant number of the students. The practice component is typically somewhat self-paced and permits students to apply knowledge presented via a lecture.

Computer training facilities often feature a training room having training computers. Each of the training computers typically has one or more pre-installed training software applications. Such a training room generally allows students to interactively practice computer skills and knowledge. For example, the training room may permit students to practice with or apply information presented via a lecture in order to obtain "hands on" experience working with the training software applications. An instructor at the training room may supervise, monitor, and assist students at the training room as the students use the training room.

Frequently, however, students must travel from remote locations to the training room for training or practice with the training computers. For some, the expense, time consumed, and inconvenience associated with having to travel from a remote location to the training room is a significant burden.

Some companies, for example, maintain a training room for training individuals, such as employees and customers, on training computers. Requiring these individuals to travel to the training room for each training session can be expensive, time-consuming, and inconvenient.

Conventional real-time communications systems permit remote users to communicate. Recent advances in such communication systems integrate voice, video and data to permit interaction and collaboration between remote users. These systems are conventionally employed for delivering lecture-type components of certain training and education to remote users. Such systems, however, are generally limited in that they fail to provide students with hands on training using preinstalled software, such as that available at conventional training rooms. Accordingly, remote students are unable to conveniently obtain benefits of practicing at a training room without having to travel to the training room locale.

Further, conventional systems fail to provide a system and method by which an instructor may designate certain training computers for use in a particular training session and managing access to these computers by remote students. These systems also fail to permit an instructor to monitor activity of the users at the training computers during a training session.

SUMMARY

A need exists, therefore, for a system and method by which remote students may participate in a training session whereby remotely-located students may train on training computers having pre-installed software and an instructor may monitor the activity of the students at the training computers. The students access the training computers remotely via a network connection.

In one embodiment, a central computer system provides a synchronous collaboration service that may be adapted for teaching. The central computer system permits individuals, such as course administrators and instructors, to manage the training computers to permit the training computers to be used during training sessions.

According to one aspect, the central computer system includes remote access software to permit a remote user to connect to the central computer system. The central computer system then connects to one or more of the training computers. In this configuration, for example, an individual, such as a student, located at a remote computer may control inputs and receive outputs from a training computer via the central computer system. A course instructor, or other authorized individual, located at a remote computer may receive outputs from a training computer via the central computer system.

Pursuant to another aspect, the central computer system provides for scheduling, configuration, and session management for training sessions. The central computer system may provide a web site comprising one or more web pages that allow an authorized individual to create and configure a set of training computers for students to access remotely. Lab administration web pages permit lab administrators to create and configure a set of training computers for a training session by users at remote computers. From the lab administration web pages, a lab administrator may remotely access each individual lab computer to configure it for remote training sessions. The lab administration web pages also permit the lab administrator, or other authorized individuals to obtain usage reports of the training computers by students at remote computers.

Lab scheduling web pages permit authorized individuals to view lab usage schedules and permit reserving training computers for future training sessions. In one embodiment, the lab scheduling web pages graphically illustrate time slots and the number of available training computers for each scheduled training session. Further, using the lab scheduling web pages, specific training computers may be assigned to specific students for one or more particular training sessions.

Accordingly, an authorized individual, such as a course instructor or lab administrator may schedule a training session and reserve certain training computers for use by remote students during the training session. During the training session, individual students remotely access associated training computers that have been reserved for the training session and train using installed training software applications. An instructor remotely oversees the activity of the students during the training session. The instructor may remote into a session of any of the training computers and view the activity on that computer. Thus, a number of remote students may access a number of training computers within a training session. An instructor monitors the activity of the students at the various training computers within the session.

In one aspect, training sessions can be live or on-demand. Live training sessions are led by a course instructor and may be attended by a number of students, at least some of which can be remote. On-demand training sessions can be sessions in which students are learning on their own (in the absence of an instructor). The on-demand training sessions may be made available to students by the course instructor or lab administrator. In one embodiment, the same resources (e.g., desktop computers) can be leveraged for both the live and on-demand training sessions.

BRIEF DESCRIPTION OF THE DRAWINGS

For a more complete understanding of embodiments of the present system and method, reference is now made to the following description taken in conjunction with the accompanying drawings.

FIG. 6 is an interface screen illustrating a listing of laboratories and the total and available computers in each of the laboratories.

FIG. 7 is an interface screen illustrating the computer selection and set-up process for a particular laboratory.

FIG. 9 is an interface screen illustrating computer availability and scheduling.

FIG. 16 is an interface screen illustrating session details.

DETAILED DESCRIPTION

Figure 1:
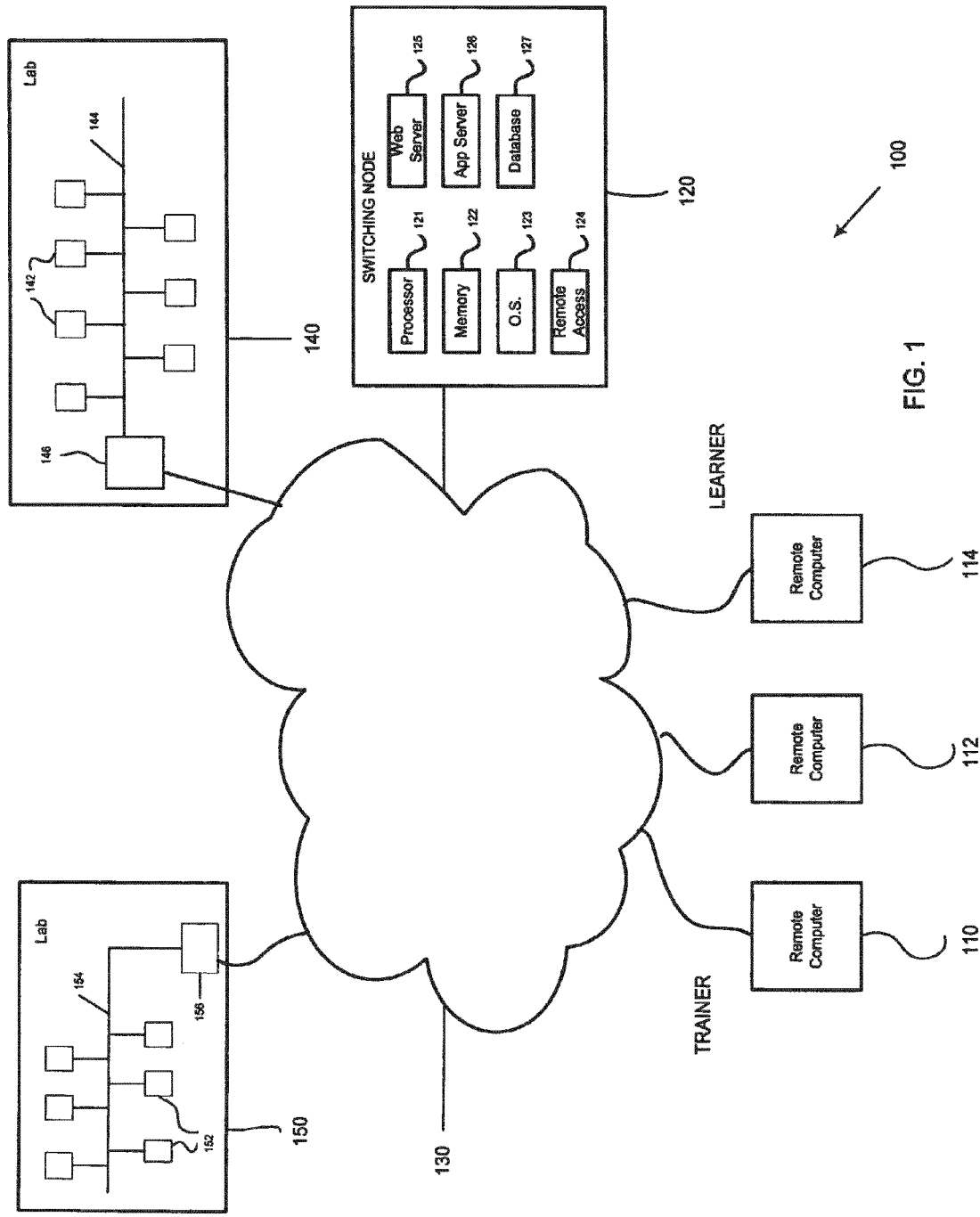
FIG. 1 is a block diagram of a system for managing remote computer training labs in accordance with an example embodiment of the present invention.

Example embodiments of the present invention and their advantages are best understood by referring to FIGS. 1 through 17 of the drawings. Like reference numerals are used for like and corresponding parts of the various drawings. The example embodiments are merely illustrative and are not in any way intended to limit the scope of the present invention as defined by the accompanying claims.
System Architecture FIG. 1 is a block diagram of an exemplary remote access system 100, according to some embodiments of the present invention. Remote computers 110, 112, 114 are connected to a central computer system 120 via a global area computer network 130. Global area computer network 130 may be any computer network connecting geographically distant locations. One such network is the Internet. The connections between remote computers 110, 112, 114 and the central computer system 120 can be any type of connection that allows data to be transferred between remote computer 110 and central computer system 120, such as a HyperText Transport Protocol (HTTP) connection. To ensure that the connection between each of the remote computers 110, 112, 114 and the central computer system 120 is secure, the data transferred over the connection can be encrypted using any suitable encryption techniques, such as Secure Sockets Layer (SSL) encryption.

Training labs 140, 150 are also connected to the central computer system 120 via the network 130. Two training labs are shown for illustrative purposes. However, the number of training labs is limitless. The connection between each lab 140, 150 and the central computer system 120 can be any type of connection that allows data to be transferred between each lab 140, 150 and the central computer system 120, such as an HTTP connection. To ensure that the connection between each lab 140, 150 and the central computer system 120 is secure, the data transferred over each connection can be encrypted using any suitable encryption techniques, such as SSL encryption.

The lab 140 includes training computers 142. In the illustrated embodiment, the training computers 142 may be connected to a Local Area Network (LAN) 144, which may be a wired or wireless network. A packet forwarding device (e.g., router, gateway) 146 is shown as interconnecting the LAN 144 to the network 130. In this configuration, each of the computers 142 may independently exchange data with the network 130.

Similarly, the lab 150 includes training computers 152. In the illustrated embodiment, the training computers 152 may be connected to a Local Area Network (LAN) 154. A packet forwarding device (e.g., router, gateway) 156 is shown as interconnecting the LAN 154 to the network 130. In this configuration, each of the computers 152 may independently exchange data with the network 130.

As described in greater detail below, a user and/or a trainer/teacher/educator can use any remote computer such as remote computers 110, 112, 114 to connect to central computer system 120 via the network 130. Once connected, the user can access one of the training computers 142, 152 as long as a connection is established between the training computer 142, 152 and the central computer system 120. Training software applications are installed at the training computers 142, 152 to permit users at the remote computers 110, 112, 114 to use the training software remotely.

For clarity, the system 100 is depicted with remote computers 110, 112, 114, and labs 140, 150, and a single computer at central computer system 120. It should be recognized, however, that the system 100 will typically include many remote computers 110, 112, 114, many training computers 142, 152, and the central computer system 120 may include multiple computers (e.g., different types of servers), and storage systems etc. . . .

In one embodiment, training sessions can be live or on-demand. Live training sessions are led by a course instructor (for example, using a remote computer 110, 112, 114) and may be attended by a number of students, at least some of which can be remote. On-demand training sessions can be sessions in which students are learning on their own (in the absence of an instructor). The on-demand training sessions may be made available to students by the course instructor or lab administrator. In one embodiment, the same resources (e.g., training computers 142 and 152) can be leveraged for both the live and on-demand training sessions.

The central computer system 120 includes a computer having a processor 121, memory 122, operating system software 123, remote access software 124, a web server 125, an application server 126, and a database 127. The processor 121 can be any suitable processor. Memory 122 can be any type of suitable memory, such as DRAM, SRAM, a magnetic hard drive, an optical hard drive, or any combination thereof. Operating system software 123 can be any type of suitable operating system software, such as MS-DOS, WINDOWS 95, 98, NT, ME, 2000, or XP, one of the many versions of UNIX (Solaris, Linux, etc.), or the Macintosh OS. For clarity, the central computer system 120 is depicted as a single computer. However, central computer system 120 may, in some embodiments, include multiple computers that perform different functions (e.g., different types of servers).

The remote access software 124 includes one or more computer programs. The one or more computer programs include computer instructions that, among other things, enable a user to connect to central computer system 120 and access a training computer 142, 152 via central computer system 120. The functionality of remote access software 124, which runs on central computer system 120, will be discussed in detail below.

The web server 125 may comprise an HTTP server that serves web pages that can be accessed by the remote computers 110, 112, 114 and by the training computers 142, 152 via the network 130.

The application server 126 generates web pages, such as dynamic web pages, served by the web server 125 based on information stored at the database 127. The application server 126 generally provides management of training sessions conducted by users at remote computers 110, 112, 114 remotely using training computers 142, 152.

The global area computer network 130 can be any type of computer network that includes numerous computers connected to one another by communications links. In some embodiments, global area network 130 comprises the Internet.

System Operation

Figure 2:
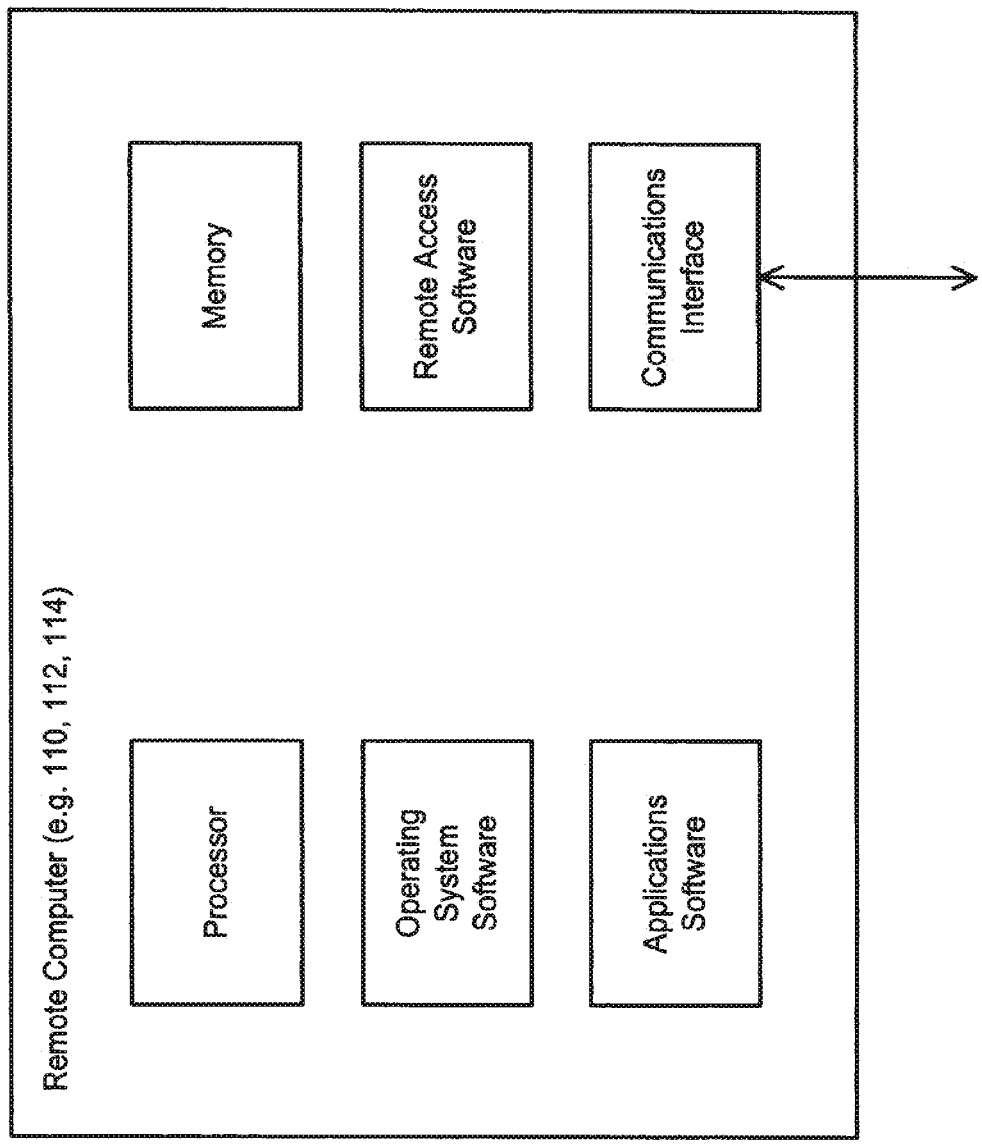
FIG. 2 is a block diagram illustrating details an example embodiment of a FIG. 1 remote computer.
Figure 3:
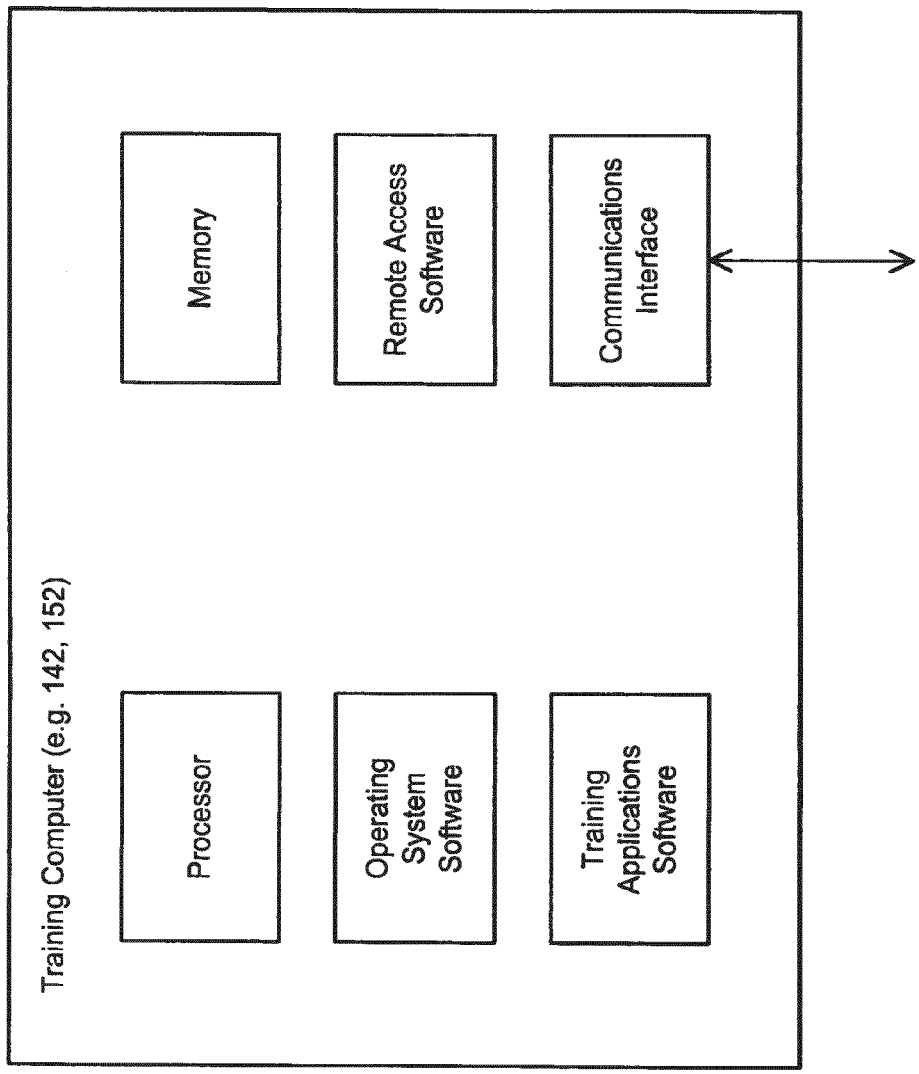
FIG. 3 is a block diagram illustrating details of an example embodiment of a FIG. 1 training computer.
Figure 4A:
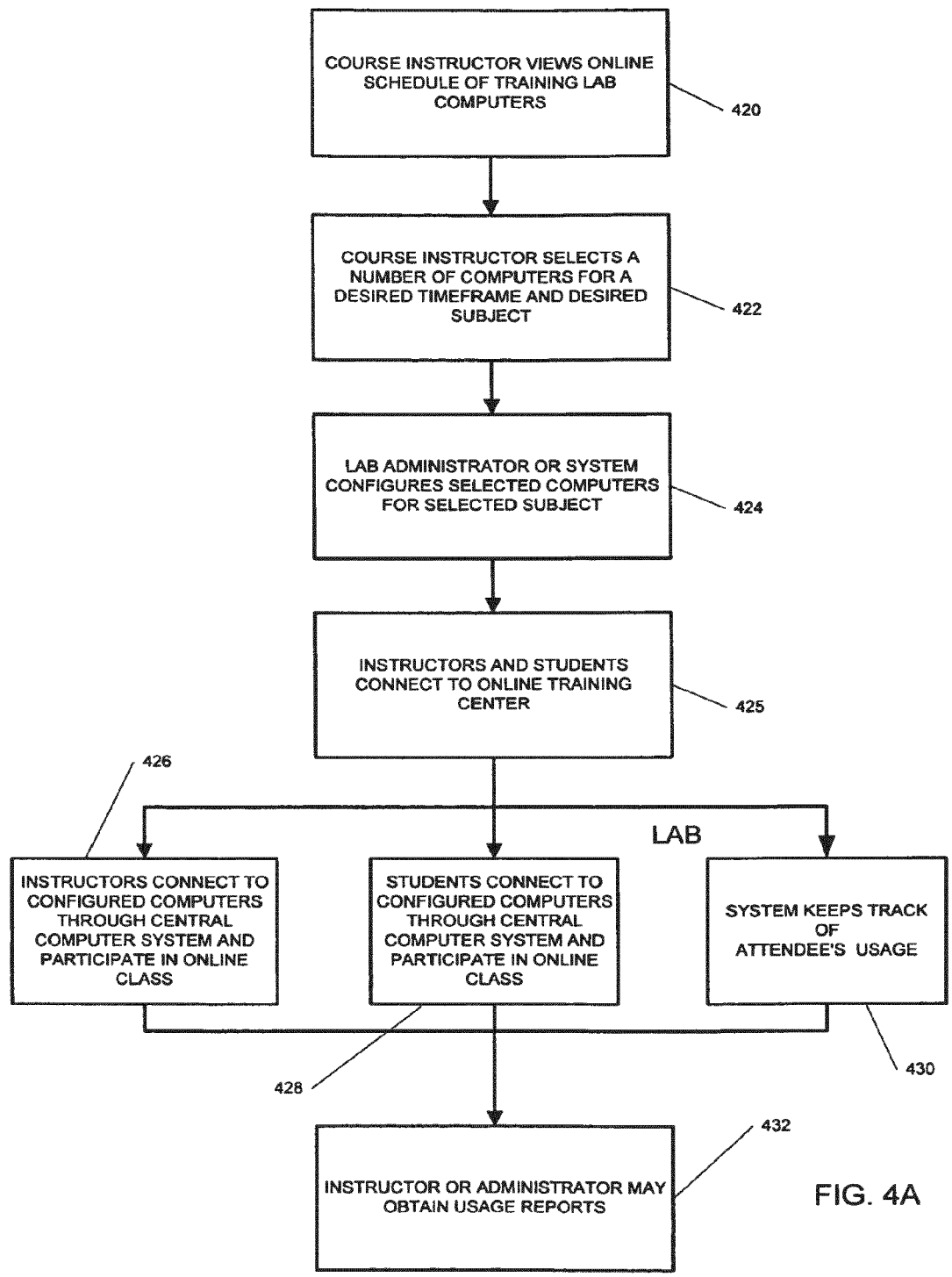
FIG. 4A is a flow chart of an embodiment of the present invention.

An embodiment of the overall process is shown in FIG. 4A, which should be viewed in conjunction with FIGS. 1-3. In step 420, a course instructor or other authorized person wishing to view the schedule of the training lab computers or to schedule time on the computers views the schedule of training computers, an example of which will be discussed later in detail with regard to FIG. 4B. Next, in step 422, the instructor selects the number of computers, the time for that he/she wishes to schedule the computers, and the subject to be studied or trained. If the lab computers are to be used in a training session of a particular application, or piece of software, the instructor can select that particular software. If the computers are to be used to teach other subject matter, for example the subject matter of an on-line course, the course materials and any programs required to present them may be chosen. Generally, to simplify the selection process, a list of material can be provided on a web page for the instructor to choose from.

In one embodiment, the application server 126 permits a training session administrator to create and configure one or more virtual computer labs for students to access remotely from the computers 110, 112, and 114. Specifically, the application server 126 generates, and the web server 125 serves, lab administration web pages that permit the training session administrator to remotely access one of the training computers 142, 152 and to remotely configure the training computer 142, 152 for a remote training session, as seen in step 424. These and other pages are seen in FIGS. 4B-17. When a selection is configured, the application server 126 will automatically configure the material for that session.

In step 425, instructors and students connect and log onto the online training center from remote computers. Next, once logged into the online training center, both teachers and students connect to the computers that have been configured for the session or class in steps 426 and 428.

The application server 126 also stores in the database 127 usage data regarding usage of the training computers 142, 152 by remote users at computers 110, 112, 114, as seen in step 430. If so desired, the course instructor, lab administrator, or any other authorized personnel may access any student or users usage data from database 127.

Figure 4B:
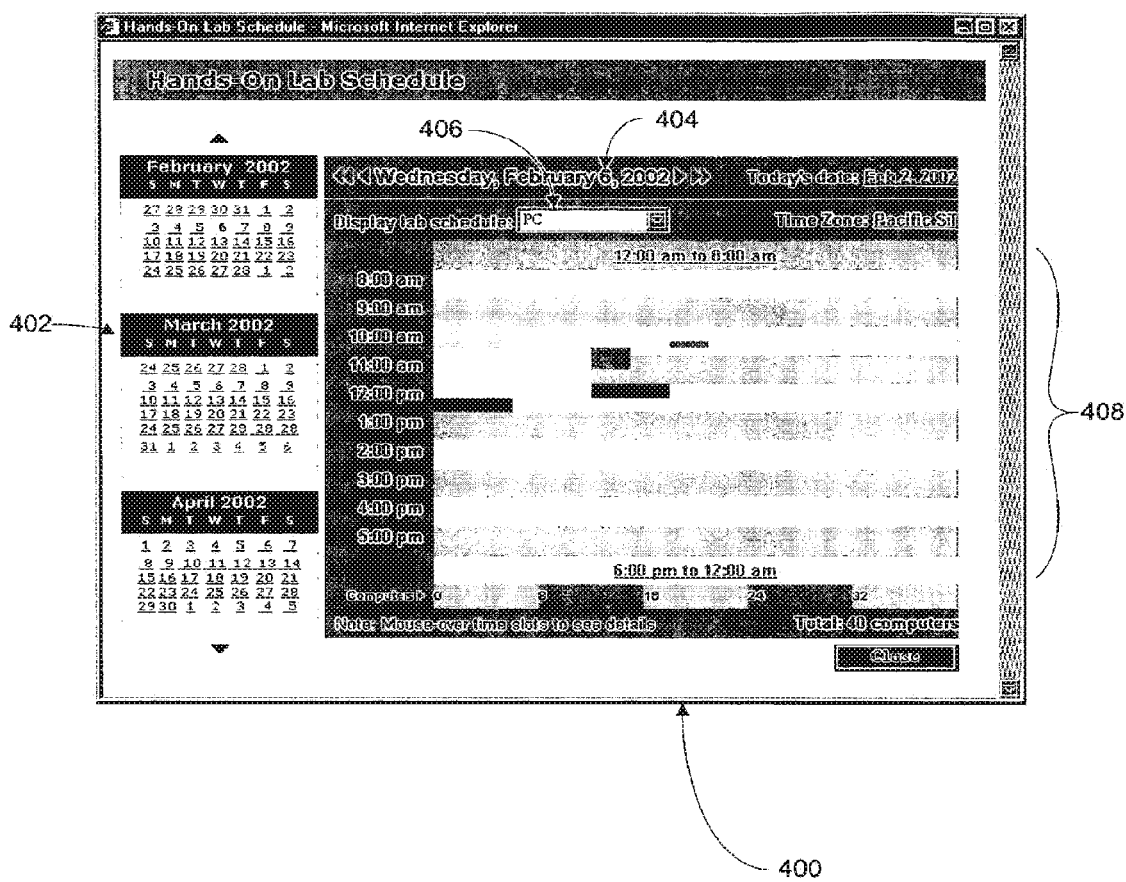
FIG. 4B is an interface scheduling screen of an embodiment of the present invention.

FIG. 4B illustrates scheduling screen 400. On screen 400 monthly views 402 appear for a number of months. A person creating or viewing the schedule of all of the training or lab computers can easily select the month and the day they wish to view. When a particular day 404 is selected from the monthly views 402, more detailed information about the particular day will appear in the expanded day view 408. If multiple computer labs are present, the user can select from the multiple labs with scroll down lab menu 406. The day can be displayed in increments of one hour from, for example, 8:00 AM to 5:00 PM. A finer gradation, displaying, for example, 10 or 15 minute intervals can also be viewed if desired. Horizontal bars extend to display the time and number of computers that are already booked, or alternatively those that are available. By scrolling over the expanded day view 408, captions will appear indicating what the subject material is, the number of computers reserved or available, and the duration of the session. By clicking on a blank space, a new reservation can be made. By clicking on an already reserved session, more details about that session can be seen, such as the name of the participants and if the user is authorized, the amount of time a selected user has spent training or studying online to date.

Hands-On Lab sessions are started by the course administrator or instructor from the Training Center client application. Once a lab session is started the course administrator can reserve computers and assign students to each lab computer for the current session. The course administrator can also "connect" to any of the lab computers that have been reserved for the students. When a participant connects to a remote lab computer, that participant can view the screen of the remote computer on their local machine.

When a selection is configured, the application server 126 will configure the material for that session. For example, as seen in FIG. 4B, a "Computer Graphics" session will be hosted by a teacher or trainer Scott Yu. The computers in lab 140 or 150 seen in FIG. 1 will then be configured to present material related to computer graphics. In other words, the lab computers will execute one or more applications or files that can be used to teach or train about computer graphics. Remote users can then access the computers within the labs remotely and run the applications or files as if they were installed on their own computer, or alternatively, as if they were sitting in the computer lab in front of one of the lab computers.

The course administrator can record all the remote lab sessions onto local files. The recording stops and starts whenever participants connect to and disconnect from the remote lab computer.

Figure 5:
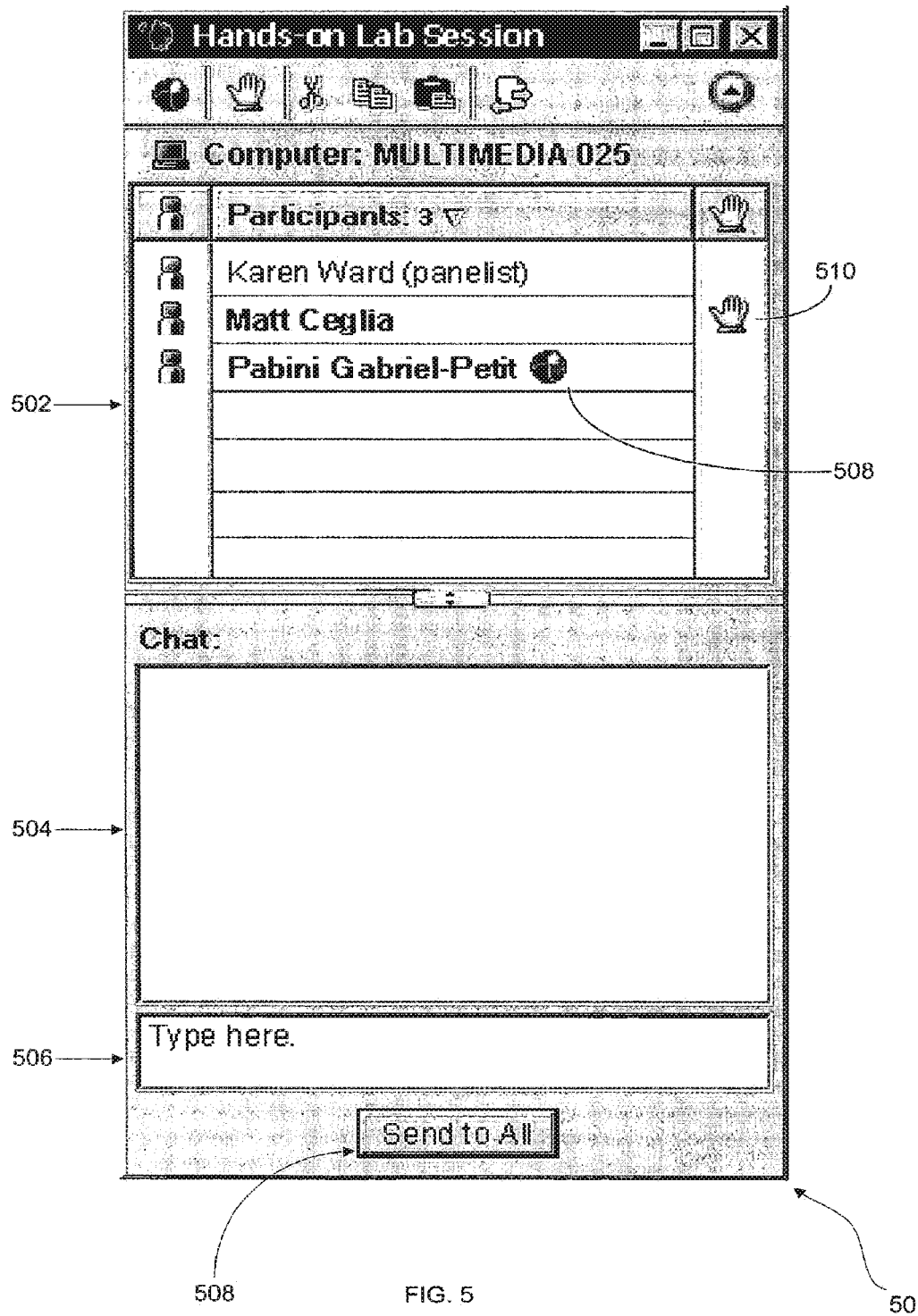
FIG. 5 is a lab session interface screen of an embodiment of the present invention.

Although multiple users can be remoted into each lab computer, it is generally preferable to allow only one of the users to control the mouse, keyboard, and display of the lab computer. However, in certain situations the system may be configured to allow multiple users to control the mouse, keyboard, and display of the lab computer. Lab session window 500, as seen in FIG. 5, can be viewed by both participant and administrators. Participant pane 502 illustrates the participants that are participating in the selected session. This dialog window 500 appears on a participants' local screen when they are connected to a remote lab computer. It displays who else is connected to the remote computer along with a text pane 504 and chat pane 506. The (multi-colored) ball 508 indicates who is in control of the remote lab computer. The course administrator (indicated as "panelist" in the figure) can use this dialog window to pass control of the remote lab computer from one participant to another. The hand in the figure indicates which of the users has control of the remote lab computer.

The process of starting, configuring, and managing a training session will now be described in detail with reference to FIGS. 6-17.

FIG. 6 is an interface screen illustrating a listing of laboratories and the total and available computers in each of the laboratories. The screen shows the lab name, the description of the lab including what subject matter, program, course, or other material is available in each particular lab, the total number of computers allocated to each lab, the number of computers currently utilized by sessions underway, and a link to the lab schedule for each lab as seen in FIG. 4B.

FIG. 7 is an interface screen illustrating the computer selection and set-up process for a particular laboratory. The screen displays a list of computers in a selected lab, the status of the computer, for example, whether the computer is available, in session, or offline. The screen also details what applications, or other training or course material is configured for use on each of the computers. An administrator or other authorized person can connect or disconnect the computers to/from a session. The administrator may also remove a computer from the lab, move selected computers to another lab, or further configure the material or set-up of selected computers.

Figure 8:
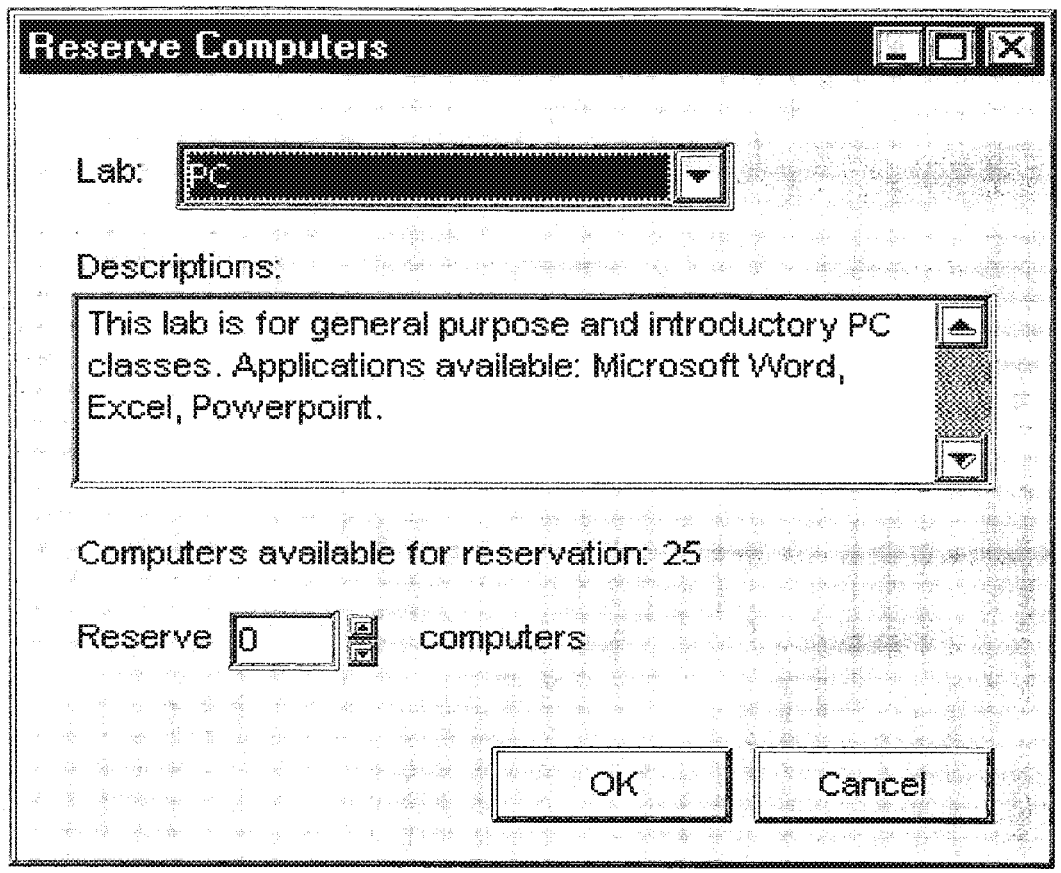
FIG. 8 is an interface screen illustrating aspects of computer reservation.

FIG. 8 is an interface screen illustrating aspects of computer reservation. This screen allows an administrator or instructor to select a lab based upon the description of the lab, and to reserve some number of the available computers.

FIG. 9 is an interface screen illustrating computer availability and scheduling. This screen illustrates scheduling conflicts for various sessions being held on different calendar dates. An administrator can either reschedule a session or negotiate with the hosts of other conflicting sessions.

Figure 10:
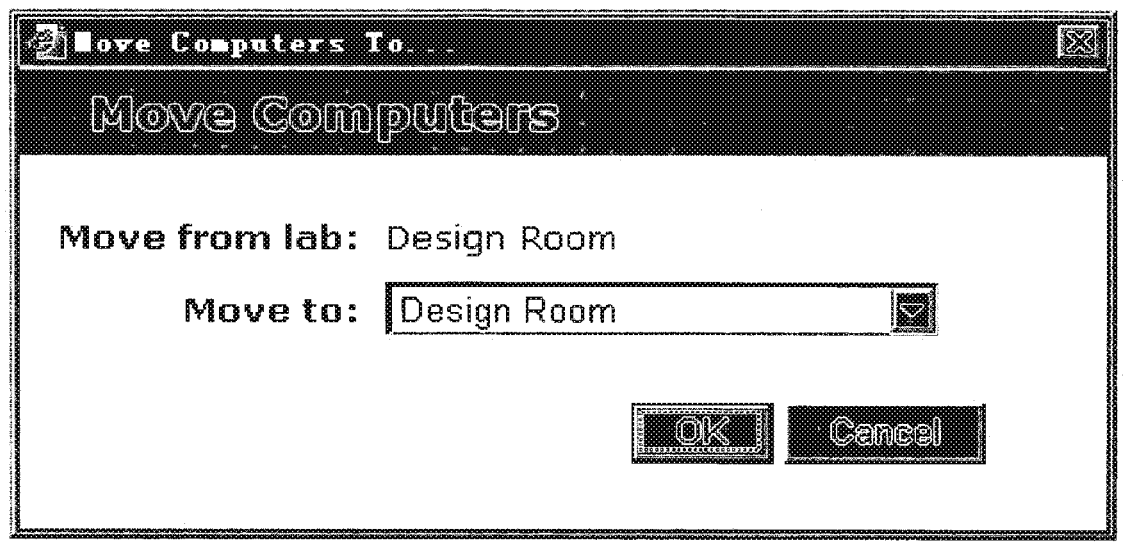
FIG. 10 is an interface screen illustrating movement of computers from one laboratory to another.

FIG. 10 is an interface screen illustrating movement of computers from one laboratory to another.

Figure 11:
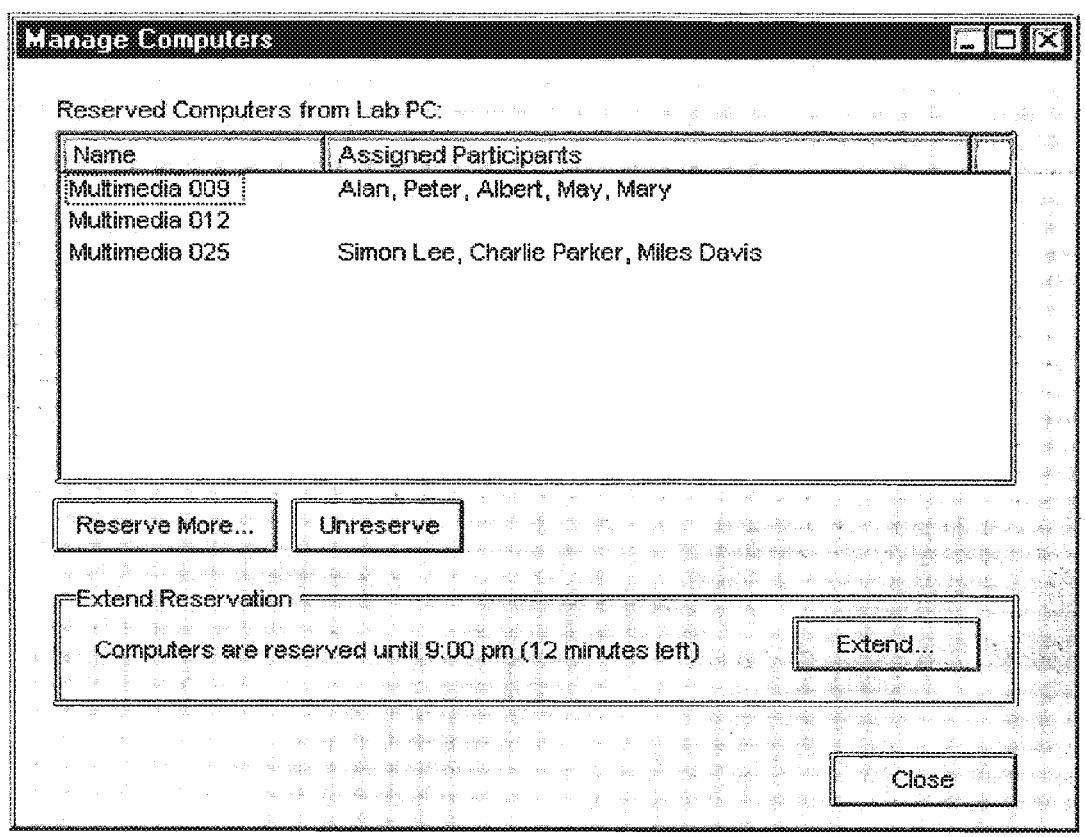
FIG. 11 is an interface screen illustrating management of the laboratory computers.

FIG. 11 is an interface screen illustrating management of the laboratory computers. This screen shows the computers reserved for one or more sessions and the participants assigned to each of the computers. An instructor may reserve/unreserve computers or extend the duration of the reservation of any of the computers using this interface.

Figure 12:
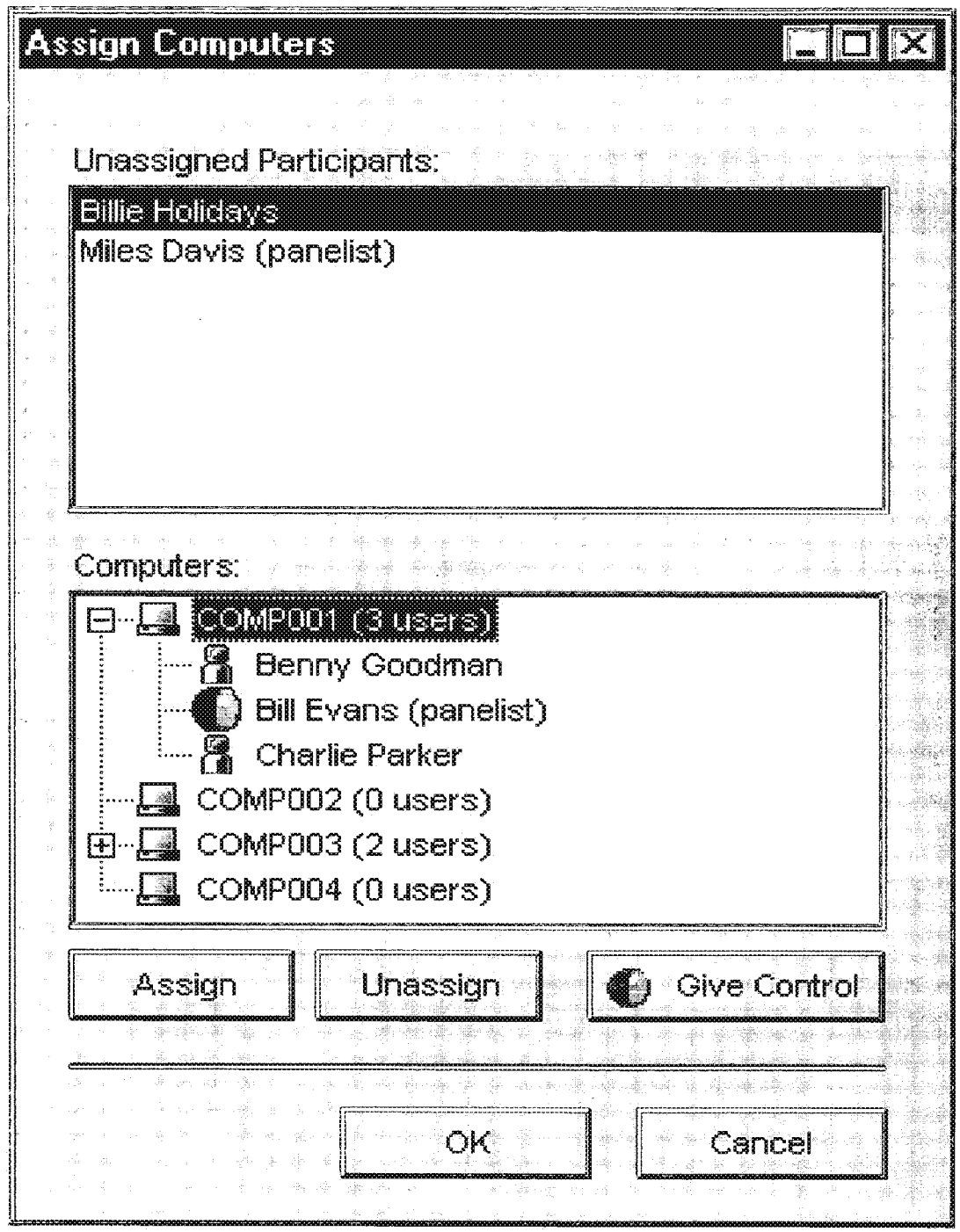
FIG. 12 is an interface screen illustrating computer assignment.
Figure 13:
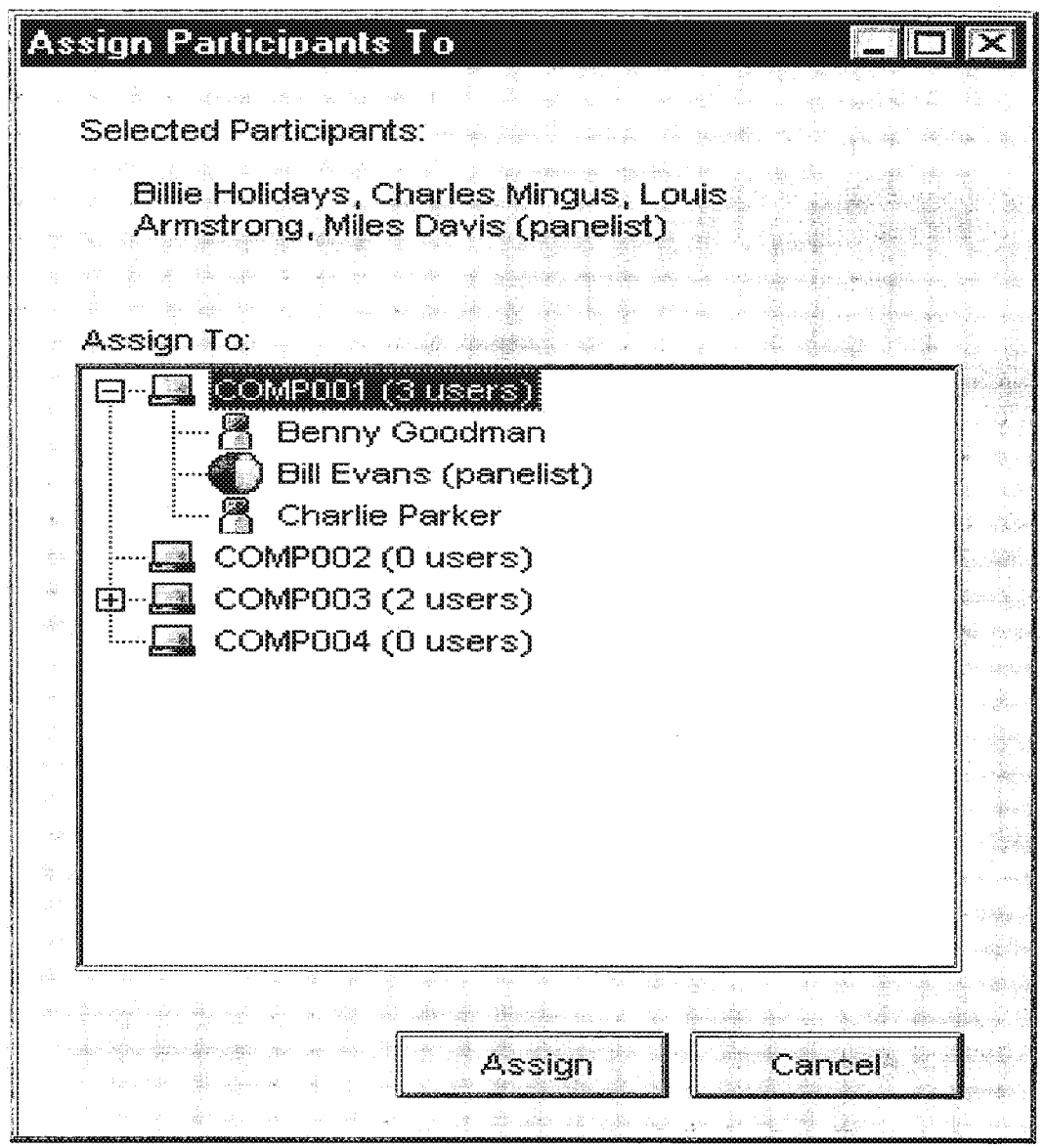
FIG. 13 is an interface screen illustrating computer and participant assignment.
Figure 14:
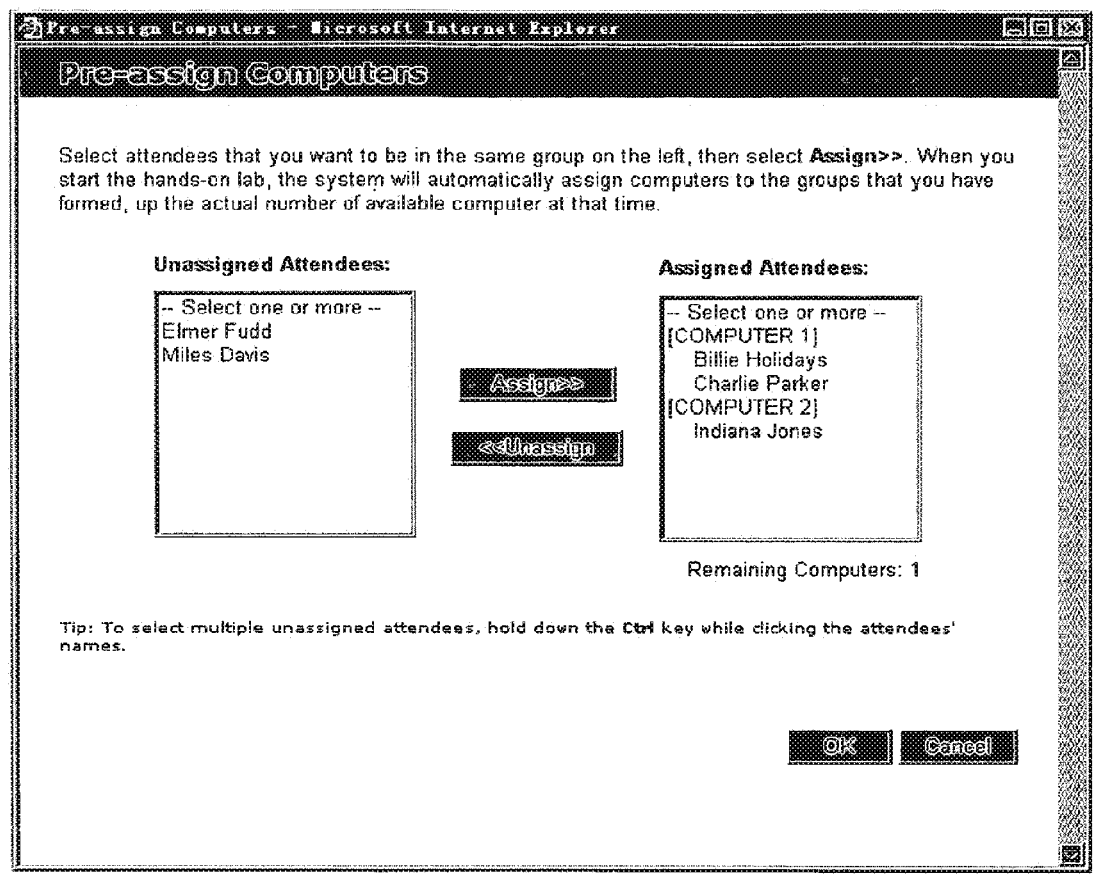
FIG. 14 is an interface screen illustrating computer usage recording.

FIG. 12 is an interface screen illustrating computer assignment. Participants can be assigned or unassigned from the various computers, and control can be allocated to a selected user. FIG. 13 is an interface screen similar to FIG. 12 illustrating computer and participant assignment. FIG. 14 is an interface screen illustrating assignment of computers. With this screen, attendees can be grouped and assigned to a selected lab.

Figure 15:
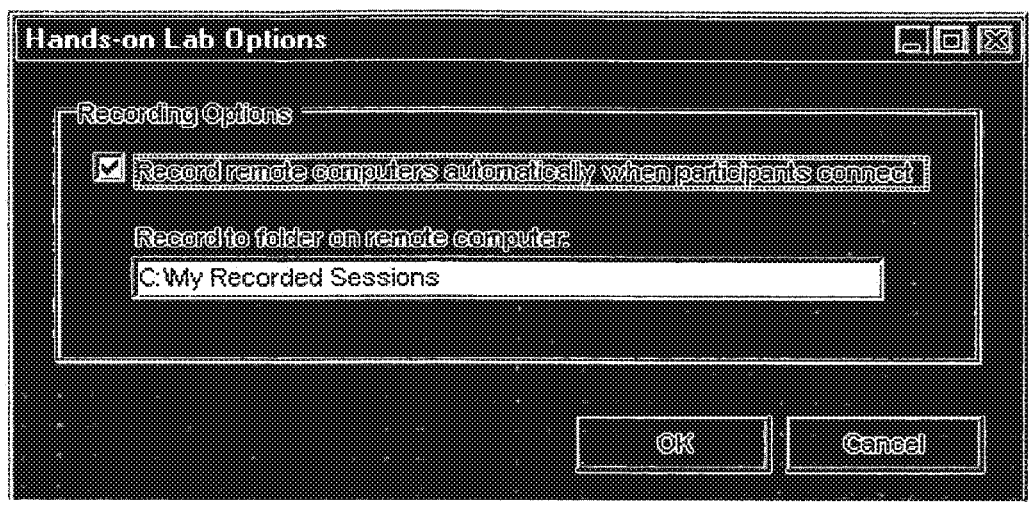
FIG. 15 is an interface screen illustrating assignment of computers.

FIG. 15 is an interface screen illustrating computer usage recording. An administrator or instructor or other authorized person can choose to record the usage and the folder where the usage will be recorded.

FIG. 16 is an interface screen illustrating session details. The screen illustrates that a session has been successfully scheduled, and allows a user to start the session (through a hyper-link). The screen also details the session information such as the topic, host, date, time, location and lab computers.

Figure 17:
FIG. 17 is an interface screen illustrating laboratory usage reports.

FIG. 17 is an interface screen illustrating laboratory usage reports. As discussed previously, participant's usage can be monitored and recorded. This information can be used for many purposes. One important use is to track a student's attendance and performance. The particular interface shown can be configured to prepare a report of selected laboratories during a selected timeframe. The results can then be sorted by any number of criteria, such as, for example by computer, topic or student.

The aforementioned screens and functions described therein can occur in any order and not necessarily the order described. The system is flexible and many of the features and functions can be accessed in different ways by the students, instructors, and administrators.

Remote Access Account Setup

Before a user can set up a target computer 120 for remote access, the user establishes a user account with a service provider. The service provider can operate a central computer system 140, which includes a website. The service provider can provide the remote access service of the present invention and may provide additional services such as data conferencing services. An example of a service provider is WebEx Communications, Inc. of San Jose, Calif.

The preferred method of accessing a target computer is described in U.S. patent application Ser. No. 10/001,435 entitled "System And Method For Accessing A Target Computer From A Remote Location Using A Remote Computer" and filed on Oct. 31, 2001, which is hereby incorporated by this reference in its entirety.

What is claimed is:

1. A method comprising:
receiving a selection of teaching material from an interface containing available material;
receiving one or more selections to reserve one or more computers of a first group of computers for a training session;
configuring the one or more reserved computers, by a central computer system, with the selected teaching material for use during the training session;
establishing a connection between a first remote computer and at least one of the one or more reserved computers, via the central computer system, for management of the training session such that the at least one reserved computer is controllable from the first remote computer through the central computer system;
establishing a connection between a second remote computer associated with a student and the at least one reserved computer such that the first remote computer maintains control of the at least one reserved computer;
establishing a connection between a third remote computer associated with a student and the at least one reserved computer; and
enabling an administrator to pass control of the at least one reserved computer between the second and third remote computers.

2. The method of claim 1, further comprising:
maintaining a schedule of availability of the first group of computers on the central computer system; and
displaying the schedule of availability of the first group of computers at the first remote computer.

3. The method of claim 2, further comprising:
displaying the schedule of availability of the first group of computers at the first remote computer through one or more scheduling web pages that graphically illustrate time slots and a number of available computers in the first group of computers.

4. The method of claim 3, wherein the one or more scheduling web pages enable an administrator at the first remote computer to assign specific training computers to specific students in the training session.

5. The method of claim 1, wherein the first remote computer is associated with an administrator, and wherein the method further comprises:
    establishing a connection between the second remote computer, associated with a student, and the at least one reserved computer such that the control of the at least one reserved computer is initially passed to the second remote computer.

6. The method of claim 5, further comprising:
    allowing the first remote computer to enter the training session while the at least one reserved computer is controlled by the second remote computer in order to supervise the training session.

7. The method of claim 1, further comprising:
    recording information about participants in the training session, a subject of the training session, and a duration of the training session.

8. The method of claim 1, further comprising:
    configuring the one or more reserved computers, by the central computer system, to execute a selected application during the training session.

9. The method of claim 1, further comprising:
    allowing the first remote computer to control one or more of the display, keyboard and mouse of the at least one reserved computer.

10. The method of claim 1, wherein receiving selections to reserve the one or more computers of the first group of computers for the training session comprises:
    receiving a selection of a number of training computers, a time for the training session, and a subject matter of the training session.

11. An apparatus comprising:
    a memory;
    one or more network interfaces configured to enable communications over a network for communications with a first remote computer and a first group of computers; and
    a processor coupled to network interfaces and the memory, wherein the processor is configured to:
        provide, at the first remote computer, an interface listing available teaching material, to receive a selection, at the first remote computer, of teaching material for use in a training session,
        receive one or more selections to reserve one or more computers of the first group of computers for a training session, to configure the one or more reserved computers with the selected teaching material for use during the training session,
        establish a connection between the first remote computer and at least one of the one or more reserved computers, via the central computer system, for management of the training session such that the at least one reserved computer is controllable from the first remote computer through the central computer system,
        establish a connection between a second remote computer associated with a student and the at least one reserved computer such that the first remote computer maintains control of the at least one reserved computer,
        establish a connection between a third remote computer associated with a student and the at least one reserved compute, and
        enable an administrator to pass control of the at least one reserved computer between the second and third remote computers.

12. The apparatus of claim 11, wherein the processor is configured to maintain a schedule of availability of the first group of computers, and display the schedule of availability of the first group of computers at the first remote computer.

13. The apparatus of claim 12, wherein the processor is configured to display the schedule of availability of the first group of computers at the first remote computer through one or more scheduling web pages that graphically illustrate time slots and a number of available computers in the first group of computers.

14. The apparatus of claim 13, wherein the one or more scheduling web pages are configured to enable an administrator at the first remote computer to assign specific training computers to specific students in the training session.

15. The apparatus of claim 11, wherein the first remote computer is associated with an administrator, and wherein the processor is configured to establish a connection between the second remote computer, associated with a student, and the at least one reserved computer such that the control of the at least one reserved computer is initially passed to the second remote computer.

16. The apparatus of claim 15, wherein the processor is configured to allow the first remote computer to enter the training session while the at least one reserved computer is controlled by the second remote computer in order to supervise the training session.

17. The apparatus of claim 11, wherein the processor is configured to record information about participants in the training session, the subject of the training session, and the duration of the training session.

18. The apparatus of claim 11, wherein the processor is configured to configure the one or more reserved computers to execute a selected application during the training session.

19. The apparatus of claim 11, wherein the processor is configured to allow the first remote computer to control one or more of the display, keyboard and mouse of the at least one reserved computer.

* * * * *